Oct. 3, 1944.  A. E. BILLGER  2,359,286

SPRING COLLET TOOL HOLDER

Filed Dec. 24, 1942

INVENTOR,
Alonzo E. Billger
By Minturn
Attorneys.

Patented Oct. 3, 1944

2,359,286

UNITED STATES PATENT OFFICE 2,359,286

SPRING COLLET TOOLHOLDER

Alonzo E. Billger, Indianapolis, Ind.

Application December 24, 1942, Serial No. 469,976

1 Claim. (Cl. 279—51)

This invention relates to means for accurately centering and retaining a tool that is used in work requiring extreme accuracy and wherein slippage of the tool in its holder would be liable to damage the piece being worked upon, such as in the art of die sinking, tool making, and fixture making.

Heretofore straight shanked cutters have been mounted in various types of chucks including spring collets. With such mounting, the cutter frequently works loose and even drops out with disastrous results to the die which may be the part being cut or developed. Usually such occurrences come after the major part of the cutting work has been done so that the damage involves quite a big loss of both time and material.

A primary advantage of the invention is found in the fact that not only does use of the invention permit positive retention of the cutter or tool, but also the cutter is axially aligned and maintained in that alignment within the close range of tolerances provided for the particular job. Furthermore no complicated mechanism is employed, but on the other hand the simple chuck employing a spring collet is utilized together with a slight modification of the customarily straight shank on the tool.

Figure 1:
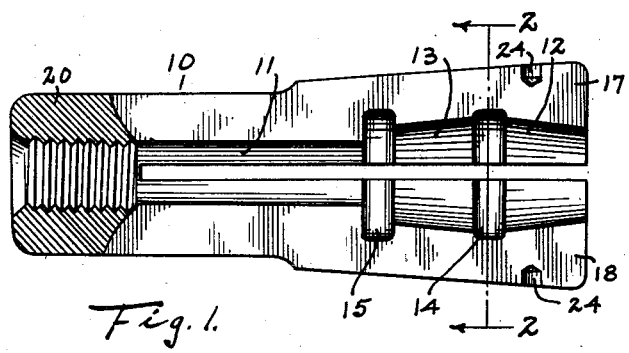
Figure 2:
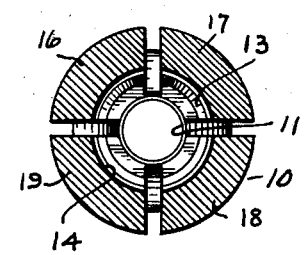
Figure 3:
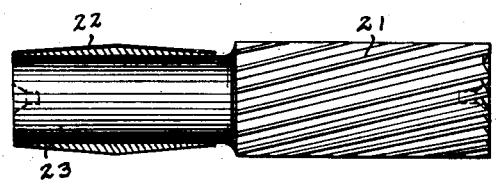
Figure 4:
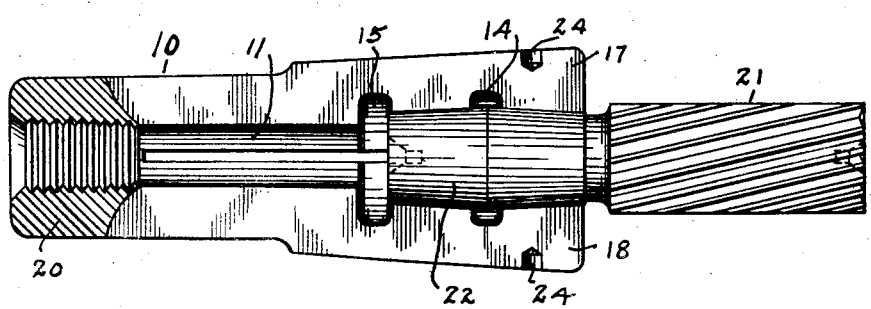

These and other objects and advantages of the invention will become apparent to those versed in the art in the following description of one particular form of the invention as illustrated in the accompanying drawing, in which Fig. 1 is a view in central longitudinal section through a spring collet formed as part of the invention;

Fig. 2, a view in transverse section on the line 2—2 in Fig. 1;

Fig. 3, a view in side elevation and partial section of one particular form of cutter having its shank formed in accordance with the teachings of the invention; and Fig. 4, a view in longitudinal central section through the collet with the cutter positioned therein.

Like characters of reference indicate like parts throughout the several views in the drawing.

A spring collet 10 is provided with an axial bore 11 entering from one end. The outer end of this bore 11, in the present example, is enlarged to provide two opposing tapered surfaces 12 and 13, the small diameter end of that tapered portion having the surface 12 being at the entrance into the bore of the collet so that the maximum diameters of the two tapered portions are adjacent one another.

For purposes of mechanical expediency, the large diameter ends of these two tapered portions of the bore are separated by relieving the bore therebetween to provide the short cylindrical depression 14 therearound and therebetween. Likewise at the inner end—the small diameter end—of the bore through the collet, the bore is relieved by the short cylindrical larger diameter portion 15. Then in order to provide separate spring fingers in the collet, the collet is split by slotting it in two planes at right angles to each other to give the four sections or fingers 16, 17, 18 and 19. The slots between these sections are carried back throughout the length of the bore 11 to terminate a distance from the end of the collet in order to provide the head 20 which is screw-threaded axially to the bore 11 in order to receive the usual draw-in rod (not shown) employed to pull the collet back into the spindle of the driving machine (not shown). The external surface of the collet about the four fingers 16, 17, 18, 19 is tapered from the large outer end to a small diameter portion forwardly of the head 20 to conform to the taper of the spindle or chuck within which the collet is to be pulled for closing the fingers snugly against the shank of the tool to be retained therewithin.

While the invention is not intended to be limited thereto, one particular form of cutter 21 is illustrated in Figs. 3 and 4. While the shank of the cutter 21 may be initially formed with opposing tapered portions conforming to the tapered surfaces 12 and 13 in the collet 10, the ordinary straight shank cutter may be used. For the straight shank, a sleeve 22 is formed to have an internal bore therethrough closely fitting around the shank 23. For a driving connection, the sleeve 22 is integrally united with the shank 23 by any suitable means, such as by use of silver solder employed between the sleeve and the shank. The clearance between the shank and the internal bore of the sleeve 22 is kept quite close, such as around .0005 inch.

The sleeve 22, before assembly on the shank 23, is provided with opposing tapered portions, the large diameter ends of which are substantially in the central part of the sleeve, as indicated in Figs. 3 and 4. The taper of each of these portions is made to conform to the tapers of the surfaces 12 and 13.

The cutter 21 thus provided with the two opposing tapered surfaces about its shank is inserted by the outer end of the shank into the bore of the collet 10 and pushed therein until the large diameter portion of the sleeve comes within the central relieved part 14 between the opposing tapers 12 and 13. The opposing tapers will cause the sleeve 22 to center itself longitudinally in respect to the tapers 12 and 13 and the opposing tapers on the sleeve 22. The taper 13, decreasing in diameter in accordance with the outer tapered portion on the sleeve 22, will prevent inner travel of the sleeve once those two tapers are in contact one with the other, and in the same manner the opposing tapered portion 12 will prevent outward movement of the sleeve 22.

The fingers or jaws 16, 17, 18, 19, of course, are yieldingly retractable in order to permit the entrance of the sleeve 22 therebetween and to provide for firm gripping about the sleeve 22 when the fingers are pressed thereagainst in the usual manner.

The oppositely tapered bore within the collet is dimensioned to have the surfaces 12 and 13 contact the corresponding tapered surfaces of the sleeve 22 when it is inserted therein before external pressure may be applied to the fingers 16, 17, 18, and 19, whereby the sleeve is properly seated in the bore by being automatically longitudinally aligned therein.

An advantage of use of the sleeve 22 in place of forming the oppositely tapered surfaces directly upon the cutter shank is had, in that the sleeve may be removed from the shank and used on other cutters. This fact permits use of standard formed shanks, commercially obtainable without requirement of special work at the plant of the cutter manufacturer.

The tapered surfaces 12 and 13 as well as the complementary tapered surfaces of the sleeve 22 are ground or otherwise shaped to within very close tolerances so that the cutter 21, when rotated through the collet 10, will rotate about its own axis with extreme accuracy. While reference has been made to the element 21 as being a cutter, it may, of course, be an end mill or any other desired tool.

As means for holding the collet 10 against longitudinal travel back into its holding spindle or barrel when the tool 21 is attempted to be pushed into the collet, sockets 24 are provided (one in each finger to balance the collet), into which sockets a pin may be selectively inserted as a stop.

While I have herein shown and described my invention in the one particular form, it is obvious that structural variations may be employed without departing from the spirit of the invention and I therefore do not desire to be limited to that precise form beyond the limitations as may be imposed by the following claim.

I claim:

For gripping a double tapered shank of a tool for driving in two directions; a spring collet body comprising a one piece member having an axial bore therein, the major portion of the member being longitudinally slotted from one end in a plurality of diametrical planes, said bore having a major diameter from which the bore tapers in both longitudinal directions to substantially equal smaller diameters, over substantially equal lengths, one of the smaller diameters being at the said split end of the body, whereby said body may rigidly guide in axial alignment through said tapers said tool when driven in both longitudinal directions.

ALONZO E. BILLGER.